Feb. 1, 1938.  A. J. CHANTRY  2,106,720
POWER TRANSMISSION MEANS
Filed Oct. 3, 1931   4 Sheets-Sheet 1

Allan J. Chantry
INVENTOR

BY
ATTORNEY

Feb. 1, 1938.     A. J. CHANTRY     2,106,720
POWER TRANSMISSION MEANS
Filed Oct. 3, 1931     4 Sheets-Sheet 2

Allan J. Chantry
INVENTOR

BY Robert A. Lavender
ATTORNEY

Feb. 1, 1938.   A. J. CHANTRY   2,106,720
POWER TRANSMISSION MEANS
Filed Oct. 3, 1931   4 Sheets-Sheet 4

Allan J. Chantry
INVENTOR

BY Robert A. Lavender
ATTORNEY

Patented Feb. 1, 1938

2,106,720

UNITED STATES PATENT OFFICE 2,106,720

POWER TRANSMISSION MEANS

Allan J. Chantry, United States Navy

Application October 3, 1931, Serial No. 566,692

25 Claims. (Cl. 74—364)

(Granted under the act of March 3, 1883, as amended April 30, 1928; 370 O. G. 757)

My invention relates to improved power transmission means adapted for varying loads. It more particularly relates to such transmissions at variable speeds as well as change in direction of the transmitted power.

Heretofore in such transmissions substantial increases in the load have resulted in the stalling of the motor even before the same could be disconnected from the transmission means by conveniently arranged and readily operable disconnecting means.

One object of my invention is to provide means for automatically preventing such stalling of the motor.

Another object of my invention is to provide means whereby a change of speed or direction may be made while the mechanism is in operation at any speed or in any direction without the necessity of releasing any clutch and without clash, noise or substantial wear, as well as to provide means whereby free wheeling is substantially attained.

A further object of my invention is to provide simple, durable, convenient and reliable means whereby the maximum speed of the driven mechanism may be fixed at will.

A further object of my invention is to provide a simple, durable and conveniently arranged and operable mechanism for carrying out the foregoing and other objects of my invention which will become apparent from the following description and drawings of my invention.

With the above and other objects in view, the invention consists in the construction, combination and arrangement of parts as will be hereinafter more fully described.

Reference is to be had to the accompanying drawings illustrating my invention in its two typical forms which I have devised for its efficient practice and forming a part of this specification in which like reference characters indicate corresponding parts throughout the several views and in which.

In the type in which I have embodied my invention, for its most convenient, durable and efficient practice, oil, air or other fluid is designed to be kept under pressure, preferably by the motor, and so directed by a control means that the desired torque and direction of movement transmitted from the motor and indicated by the control means, may be maintained to accomplish the stated objects of my invention and without stalling the motor due to substantial sudden increase in the torque upon the motor. Said pressure fluid preferably is adapted to operate the clutch members both into and out of their clutching engagement, as well as to maintain such clutch members in their desired positions. However, the holding of each clutch engagement by the fluid pressure so that said clutching engagement may slip automatically whenever a given maximum torque is exceeded, is most desirable.

More specifically said fluid pressure is adapted to act upon one or more pistons to accomplish said operation and control of the clutch members. Still more specifically the fluid pressure is adapted to be taken from a common sump or supply, placed under pressure, preferably by the motor or some part driven thereby, passed to said piston or pistons and after use the device, with its leakage, is returned to said sump or supply for reuse.

In the accompanying drawings in which like characters of reference indicate the same parts, 10 represents the primary shaft of the transmission means, which shaft may be positively connected to the crank shaft of the motor by bolts or otherwise, or may be connected thereto through a suitable friction clutch, as may be desired, although in many cases with my invention such friction clutch may be dispensed with.

Figure 6:
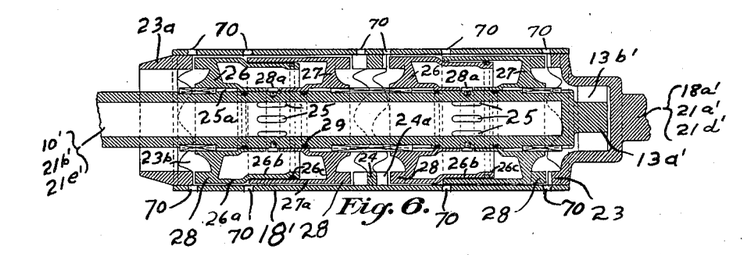
Fig. 6 is a central, longitudinal, sectional view of a different type of clutch mechanism adapted also to automatically slip and not to stall the motor when the load exceeds a definite maximum and which mechanism may be substituted for any or all of the clutch cylinders illustrated in Figs. 1 and 2.
Figures 6A, 6B, 6C, 10:
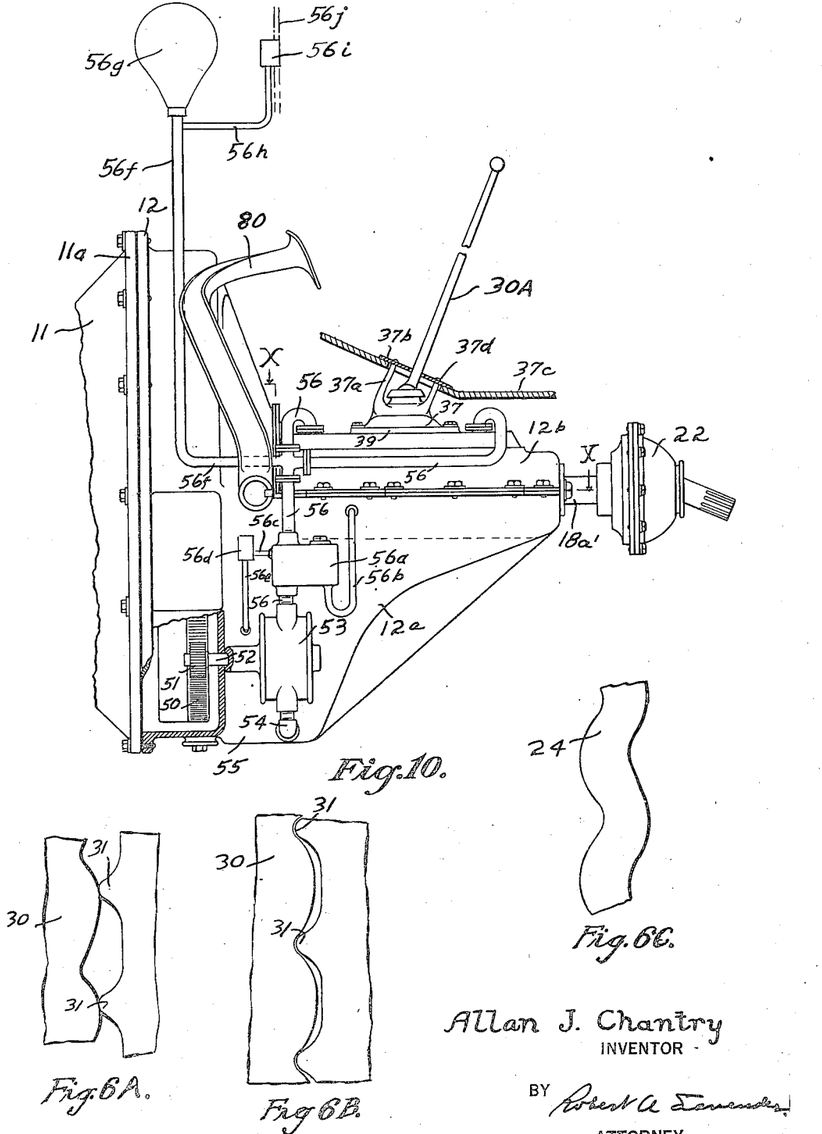
Figs. 6A and 6B are enlarged plan views of a portion of the cam driving surfaces 30, 31 on portions 23, 23b, and 28 in different relative driving positions.
Fig. 6C is a similar view of a portion of cam ring 30.
Fig. 10 is a side elevation view illustrating my invention as applied to an automobile, motor boat or other device.

In the type of installation of my invention shown in Fig. 10, 11 represents a portion of the motor frame work or casing having its usual integral transmission assembly ring 11a to which is bolted the transmission casing assembly ring 12 preferably integral with the transmission casing 12a whose upper portion 12b is removably attached to casing 12a substantially along a plane coincident with the longitudinal center of shaft 10. Casing portion 12b is adapted to cover the upper portion of the hereinafter described clutch mechanism, while the lower portion thereof is housed by the juxtaposed portion of casing 12a.

Preferably upon the end of shaft 10 remote from the motor is a preferably enlarged head 13 preferably provided with a plurality of radially extending openings 14 therein, which openings are preferably formed round and each of said openings 14 are adapted to contain a preferably round piston 15, prevented from entering too deep into each opening 14 by a lug or rib 16 secured to said head 13 preferably to such point as will not permit the head of the piston to enter its opening 14 further than to conform with the outer periphery of head 13. Each piston 15 is preferably feathered to and free to slide non-revolubly within its opening 14. The head of each piston 15 is preferably provided with a conical ridge or wedge-shaped portion 17 extending across the head of said piston preferably at its center and extending parallel to the axis of head 13. A tubular sleeve 18 preferably surrounds head 13 and is rigidly secured at one end to a shaft 18a. The bore of tube 18 is provided preferably with a plurality of conical or wedge-shaped ridges 18b each preferably extending longitudinally of tube 18 throughout the extent of openings 14 in head 13. The apex of the ridge or ridges 18b terminate at a point which affords a clearance space between said point or points and the periphery of head 13. The end of head 13 adjacent shaft 18a is provided with a bearing projection 13a engaging in bearing 13b carried by the adjacent end of shaft 18a. Shaft 18a has rigidly secured thereto a gear 19 which meshes with an idler gear 20 which meshes with a gear 21 rigidly secured to one end of shaft 21a having rigidly secured thereto a sleeve 18 such as heretofore described in connection with shaft 18a, Figures 1 and 2. Shaft 21a carries bearing 13b accommodating bearing portion 13a of head 13 revolubly mounted within tubular sleeve 18 and rigidly secured to one end of shaft 21b near whose opposite end is rigidly secured a gear 21c meshing with gear 10a rigidly secured to shaft 10. Coaxial shafts 21a and 21b are preferably mounted to one side of coaxial shafts 10 and 18a, while coaxial shafts 21d and 21e, respectively similar to shafts 21a and 21b heretofore described, are revolubly mounted to the opposite side of coaxial shafts 10, 18a. Said shaft 21e has rigidly secured near one end thereof a gear 10b which meshes with said gear 10a, while at the end of shaft 21d is rigidly secured a gear 10c meshing with said gear 19.

Shaft 10 is hollow for a portion of its length adjacent its head 13, while shafts 21b and 21e, with each of the heads 13 of shafts 10, 21b and 21e are hollow throughout their length and communicate with the pistons 15 in each of the openings 14 in each of the heads 13.

Oil or other fluid pressure applied to the hollow of either shaft 10 or shaft 21b or 21e will cause the pistons 15 in the head 13 secured to the shaft to which such pressure is applied, to be moved radially outward in their openings 14, and the apexes 17 of such outwardly thrust pistons 15 to engage the wall of the bore of its associated tube 18 with a pressure substantially equivalent to that exerted by such fluid upon the pistons. The force of the contact between the apexes 17 and the bore of tube 18 may be sufficient to drive the tube 18. Should the same be insufficient then such apexes 17 will slide over the surface of the bore of tube 18 and into engagement with the inclined surfaces of the ridges 18b projecting inwardly from the surface of the bore of tube 18. The power transmission torque is a factor of the fluid pressure forcing the apexes 17 of pistons 15 into engagement with and the angularity of the surface of the bore of tube 18, as well as of the centrifugal force of the pistons 15, which pistons are formed hollow, preferably of uniformly thin metal as shown in dotted lines in Fig. 2, in order to reduce to a minimum the said variable contributing factor of the centrifugal force of the pistons 15. When the power transmission torque increases, suddenly or otherwise, to a degree likely to stall the motor, the fluid pressure is adapted to be set to permit slippage in the drive and prevent such stalling by causing apexes 18b, acting as cams engaging the apexes 17 of pistons 15, to force the pistons 15 inwardly against the pressure of the fluid until the apexes 17 clear the apexes 18b whereupon the apexes 17 of pistons 15 are thrust outwardly by the fluid pressure which keeps the apexes 17 of pistons 15 in contact with the bore of tube 18. This relative movement of the pistons 15 and the tube 18 is continued either until the motor picks up speed sufficient to transmit the requisite torque through the piston apexes 17 engaging with the bore of the selected tube 18, or until the selected tube has been disengaged and a different tube and its co-operating pistons 15 embraced in a different gear ratio has been selected to transmit the required power-torque.

In the embodiment of my invention disclosed in Figures 1 to 4 inclusive, shafts 10 and 18a are adapted to transmit the highest forward speed, during which its associated shafts 21a—21b and 21d—21e function merely as idlers. The lower forward speeds are transmitted to shaft 10, thence to gear 10a, thence to gear 10b, thence to shaft 21e, thence to tube 18 fixed to shaft 21d, thence to gear 10c, thence to gear 19 fixed to shaft 18a and thence to without the gear case where the driving torque may be utilized, in which case the portions of shafts 18a and 10, with their associated parts, intermediate gears 10a and 19 function as idlers. Backing speeds are transmitted from shaft 10 to gear 10a thence to gear 21c, thence to shaft 21b, thence through pistons 15 to tube 18 rigidly upon shaft 21a, thence to gear 21, thence to idler gear 20, thence to gear 19 and thence to shaft 18a which transmits the backing power to a point outside the gear casing where it may be utilized. While backing, the portions of shafts 10 and 18a with their associated parts intermediate gears 10 and 19 function as idlers.

When the fluid pressure is applied to the pistons 15 associated with a tube 18 fixed to either shaft 18a, 21d, or 21a, the driving torque will accordingly be transmitted either at full forward speed, or at lower forward speed, or reverse.

The thus described change speed mechanism is enclosed in a casing whose portions 12a and 12b are bolted together substantially as shown in Fig. 10 with the usual gasket in the joint therebetween. The shafts 10—18a, 21d—21e, and 21a—21b are provided with suitable bearings within such a casing, which bearings may be as diagrammatically indicated in Fig. 1. From this casing the shaft 18a projects and may be connected to the driven mechanism either through a universal joint 22, typically shown in Fig. 10, or in any other convenient or suitable manner.

I have devised a modified form of tubes 18 and their cooperating pistons and associated parts. This modified form is shown in Fig. 6. This modification is designed to be employed upon and to connect the respective shafts 10—18a, 21e—21d, 21b—21a, which, with other parts of the heretofore described change gear mechanism employed in this modification, will be designated by the same reference character heretofore employed with the addition of an exponent "'".

A tube 18' is secured at one end to each of the shafts 18a', 21a', and 21d'. Shaft 10' extends into tube 18' secured to shaft 18a'. Into the tube 18' secured to shaft 21a' extends shaft 21b'. Into the tube 18' secured to shaft 21d' extends shaft 21e'. The shafts 21e', 10' and 21b' are provided with bearing portions 13a' provided with bearings 13b' carried by their respective shafts 21d', 18a', and 21a'. Secured at or near each end of each tube 18' are cam or clutch rings 23, 23a each having cam or clutch projections or teeth 23b upon their inner faces. Substantially midway between said rings 23 and 23a is rigidly secured to the inner surface of each tube 18' a cam or clutch ring 24 having cam projections or clutch teeth 24a upon each of its opposite faces. These rings 23, 23a, and 24 extend from the bore of each tube 18' inwardly a distance such as will afford the desired length and distance for their said cam projections or clutch teeth. Between each of the cam or clutch rings 23—24 and 24—23a on each shaft 10', 21b', and 21e' are feathered and free to slide, by suitable keys cooperating in key-ways 25a, a pair of pistons 26 and 27. Each of these pistons 26 and 27 are provided with a central hub which surrounds and slides longitudinally upon its respective shafts 10', 21b', and 21e'. Each of the pistons 26 and 27 are respectively provided with skirts 26a, 27a whose outer surfaces are of such diameter as to afford a substantial clearance space within the inner wall of each tube 18', while each skirt 27a is telescoped over a portion 26b of each of its associated skirts 26a, each of which portion 26b being of reduced diameter adapted to slide within the bore of each of its associated skirts 27a. A packing ring 26c is provided between each skirt portion 26b and its associated skirt 27a to prevent or retard leakage from or to the interior portion of each of the telescoped piston skirts 26a and 27a. Upon the head of each piston 26 and 27, and preferably of different metal and secured thereto, is a cam or clutch ring 28, said ring 28 being adapted to be engaged with or disengaged from their juxtaposed rings 23, 24, and 23a.

Each of the shafts 10', 21b', and 21e' is tubular in order to admit the fluid pressure into one or the other of their respective bores as may be desired. Each of the shafts 10', 21b', and 21e' is provided with a plurality of ports 25 adapted to admit the fluid pressure from the bores of such tubular shafts to the space between the skirts 26a, 26b, and 27a respectively of pistons 26 and 27 and between the hubs of said pistons, a screw or other limit stop 28a being secured to each of said shafts, Fig. 6, between the hubs of each pair of pistons 26 and 27 to prevent said pistons from shutting off said flow of oil through said ports 25. On each of the opposite sides of each set of ports 25 each of said shafts is provided with an oil retaining ring 29 engaging their respective shafts and the bores of the respective hubs of pistons 26 and 27 to prevent the seepage of oil therethrough from ports 25 as well as from the oil cavity within the skirts of each pair of pistons 26 and 27.

Each ring 23, 23a, and 24 is preferably formed of cam surfaces 30, Fig. 6A, and the cooperable face of each ring 28 is provided with cam projections 31 typically shown in Figs. 6A, 6B. The cam surfaces 30 for each pair of pistons 26 and 27 are preferably staggered relative to the cam projections 30 for another pair of pistons 26 and 27 upon the same shaft; and the cam projections 31 on each ring 28 of tube 18', adapted to cooperate with said cam projections 30, are likewise staggered relative to the cam projections 30 of another pair of pistons 26 and 27. The fluid pressure applied at will to either tubular shaft 10', 21b', or 21e' will flow through its ports 25 into the cavity between each pair of pistons 26 and 27 and confined by the skirts thereof. This fluid pressure will cause each pair of pistons 26 and 27 to move away from each other and to bring their respective cam projections 31 into engagement with the cams 30 upon rings 23, 23a, and 24 with a force proportionate to the fluid pressure. Such engagement of cams 30 and 31 will cause the driving torque to be transmitted yieldingly through said cam engagement. Such yielding torque transmission will prevent the stalling of the motor.

While in Fig. 6 I have shown two pairs of pistons 26, 27, it is desired to be understood that one or any other number of such pair may be employed. When the fluid pressure causes the engagement of the cams 30 and 31 of either the high forward speed, the low forward speed or the reverse, the driving torque will be correspondingly transmitted, while said named driving elements to which the fluid pressure is not applied will not have their respective cams 30 and 31 in driving engagement and hence will function merely as idlers.

The fluid pressure may be applied to either of the shafts 10, 21b or 21e of the form of the embodiment of my invention shown in Figures 1 to 4 or to either of the shafts 10', 21b' or 21e' of that type of construction in which my invention is embodied as illustrated in Fig. 6, in any conventional or desirable manner whereby the fluid pressure selects the particular shaft corresponding to the particular speed and/or direction in which the driving torque is to be transmitted. However, I have devised a typical form of such means which is illustrated in Figures 7 to 10 inclusive. Such typical form has been devised to conform substantially to the change gear practice for instance in automobile driving. In said typical mechanism 30A represents the change gear lever which extends preferably downwardly through a substantially X-shaped opening 31 in plate 32. Beneath said plate 32 said lever 30A is provided with a ball fulcrum 33 mounted in the usual split bearing 34 therefor. Said lever 30A is provided with an arm 35 extending from said ball fulcrum 33 and is provided with a preferably round terminal portion 36 adapted to be engaged with means for desirably changing the driving ratio.

Figure 9:
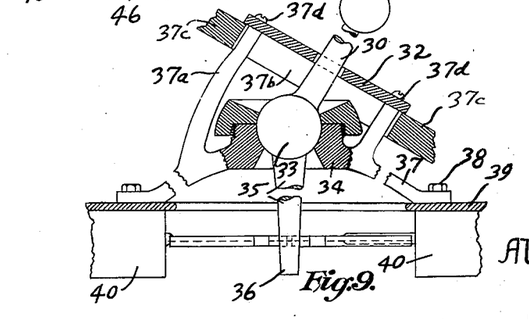
Fig. 9 is an enlarged side elevation view of the clutch control lever including adjacent portions of the mechanism operated thereby and showing certain parts in section.

The bearing 34 is provided with a base 37, Figures 9 and 10, which is secured by bolts 38 or otherwise preferably to a raised central portion 39 of casing portion 12b. Arms 37a of base 37 project through opening 37b in floor 37c or otherwise, to desirable position plate 32, and said plate 32 is secured to said arms 37a by screws 37d or otherwise.

Figure 8:
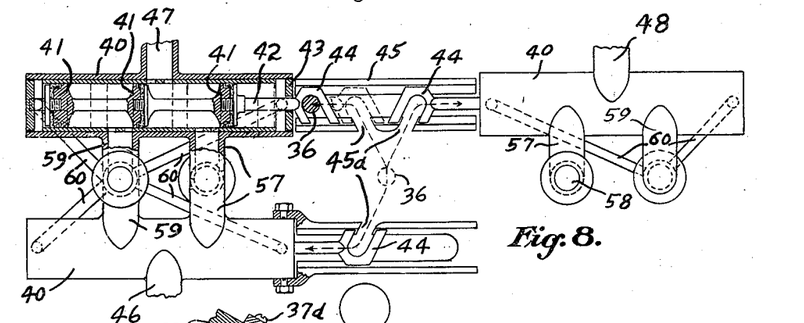
Fig. 8 is a diagrammatic plan view of the clutch control mechanism showing one of the control units in central, longitudinal section.

Preferably upon the inner surface of portion 39 of casing 12b are secured a plurality of cylinders 40, Fig. 8, one for each tube 18 or 18' heretofore described, for controlling whether or not fluid pressure is to exist within any of such tubes. Slidable within each cylinder 40 are a plurality, preferably three, of pistons 41 secured to a piston rod 42 projecting through the cylinder head 43 where it is adapted to be provided with the usual packing gland to prevent leakage about said rod 42 where it passes through said head 43. Rigidly secured upon the outer end of each rod 42 is a substantially U-shaped member 44 slidably mounted upon a guide 45 preferably upon each side thereof and suitably secured either or both to the cylinder 40 and/or casing portion 39.

In the instance shown in the drawings, three cylinders 40 are provided, two upon one side of portion 36 of gear shift lever 30A, and one upon the opposite side thereof, as shown in Fig. 8. In this figure the lower left cylinder 40 is connected by fluid pressure supply pipe 46 to the bore of tubular shaft 10 or 10', which is adapted to give high forward speed; the upper left cylinder 40 is connected by pipe 47 with the bore of tubular shaft 21e or 21e', which is adapted to give low forward speed; while the upper right-hand cylinder 40 is connected by pipe 48 with the bore of tubular shaft 21b or 21b', which is adapted to give a reverse driving movement.

Figure 7:
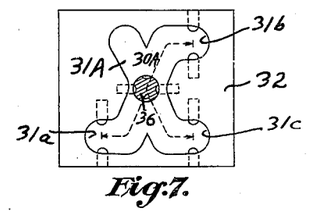
Fig. 7 is a plan view of the means for controlling the motion of the control lever which lever is shown in section.

The substantially X-shaped opening 31A in plate 32, Fig. 7, adapted to contain portion of gear shift lever 30A, is provided with lateral terminal extension 31a of said opening 31A at its lower left, and at its upper and lower right respectively with terminal extensions 31b, 31c. When portion 36 of gear shift lever 30A occupies extension 31a of opening 31A the gear shift lever is adapted to operate pistons 41 in the upper right or reversing cylinder 40 shown in Fig. 8; and when in opening 31c the same is adapted to operate the pistons in the lower left or high forward speed cylinder 40 shown in Fig. 8; while when in extension 31b the same is adapted to operate the pistons in the upper left or low forward speed cylinder shown in Fig. 8.

Gear 50, Fig. 10, driven by the motor meshes with the gear 51 of driving shaft 52 which drives oil or other fluid pressure pump 53. Pump 53 intakes its fluid from pipe 54 preferably leading from the bottom of oil or other fluid pressure supply space 55 provided preferably within frame portion 12a. Pump 53 supplies fluid pressure to pipe 56 branched to opposite sides of gear shift lever 31A and preferably into the top 39 of casing portion 12b, where the branched portions of pipe 56 respectively connect with and supply pipes 57 and 58, Fig. 8, which enter their respective cylinders 40 at points in the length of such cylinders 40 offset at least the thickness of one piston 41 from the plane at which the respective pipes 46, 47 and 48 enter their respective cylinders 40. Each cylinder 40 is provided with a fluid outlet pipe 59 which enters its respective cylinder 40 substantially the thickness of one valve 41 toward the closed end of each cylinder 40 from the point where their respective pipes 46, 47 and 48 enter the same. Pipes 59 receive the used oil, and its seepage around pistons 41, to oil supply space 55.

The portion of each guide 45 toward the portion 36 of change gear lever 30 has an opening 45a therein through which said portion 36 is adapted to pass, Fig. 8. In the normal position of each piston rod 42 with its rigid pistons 41 the opening in the portion 44 of each of the respective piston rods 42 registers with their respective openings 45a. The neutral position of the gear shift lever 30A is that in which its portion 36 is in the center of the substantially X-shaped opening 31A in plate 32 as shown in Fig. 7, in section and by dotted line in Fig. 8. The movement of said portion 36 in the diagonal portions of the openings 31A from said neutral position to the end of either of the diagonal portions of the openings 31A will cause said portion 36 of gear shift lever 30A to pass through one of the openings 45a through guide 45 and into the opening in said portion 44 of piston rod 42; and the movement of said portion 36 into either of the openings 31a, 31b or 31c, Fig. 7, of plate 32 will cause the movement of the portion 44 of the particular piston rod 42 to be moved from the slot 45a toward the cylinder 40, substantially from the dotted position shown at the upper left of Fig. 8 to that position there showing said parts in full lines. In such last stated movement the confines, for instance, of portion 31a of slot 31A, as well as the oppositely disposed guides 45, will prevent said portion 36 of gear shift lever 30A from being moved out of the opening in said portion 44 of its operated piston rod 42 until said lever returns said portion 44 with its rod 42 and pistons 41 to normal position where said portion 36 of lever 30 may be moved through opening 45a in the appropriate guide 45 to normal position. In its operated position away from normal of each piston rod 42 with its attached parts, typically of the upper left cylinder 40 in Figs. 8, 14, the fluid pressure is adapted to flow from pipe 57 into cylinder 40 between the central and the inner pistons 41, and thence through the pipe 47 to enable the driving torque to be transmitted through the means and at the rate aforesaid. When said piston rod 42, typically at the upper left of Fig. 8 is returned to its normal position, there shown in dotted lines, the end piston 41 prevents the fluid pressure from pipe 57 from entering said pipe 47 while the end and central pistons 41 form an intermediate through passage connecting pipes 47 and 59 which permits the fluid in pipe 47 and its connected parts to flow partially therefrom into pipe 59 and thence into the fluid supply cavity 55, Fig. 10, in casing portion 12a. In the normal position of piston rod 42 in the lower left cylinder 40 of Figs. 8, 14, the permissible return flow of the fluid is from pipe 46 to pipe 59 and thence to 55, as aforesaid. In the operated position of said last named piston rod the flow of fluid pressure is from pipe 57 to pipe 46 to enable the driving torque to be transmitted at the rate and direction determined therefor. In the position of piston rod 42 shown at the upper right of Fig. 8 the permissible return flow of the fluid is from pipe 48 to pipe 59 and thence to 55 as aforesaid; while in its operated position the pressure fluid is adapted to flow from pipe 58 to pipe 48 to permit the driving torque to be transmitted at the rate and in the direction determined therefor as aforesaid. A drain pipe 60 connects each of the opposite ends of each cylinder 40 with its adjacent fluid return pipe 59 to enable the fluid that may escape around each of the outer pistons 41 to be drained into said pipe 59 and thence into the fluid supply cavity 55.

Figures 1, 2, 3, 5:
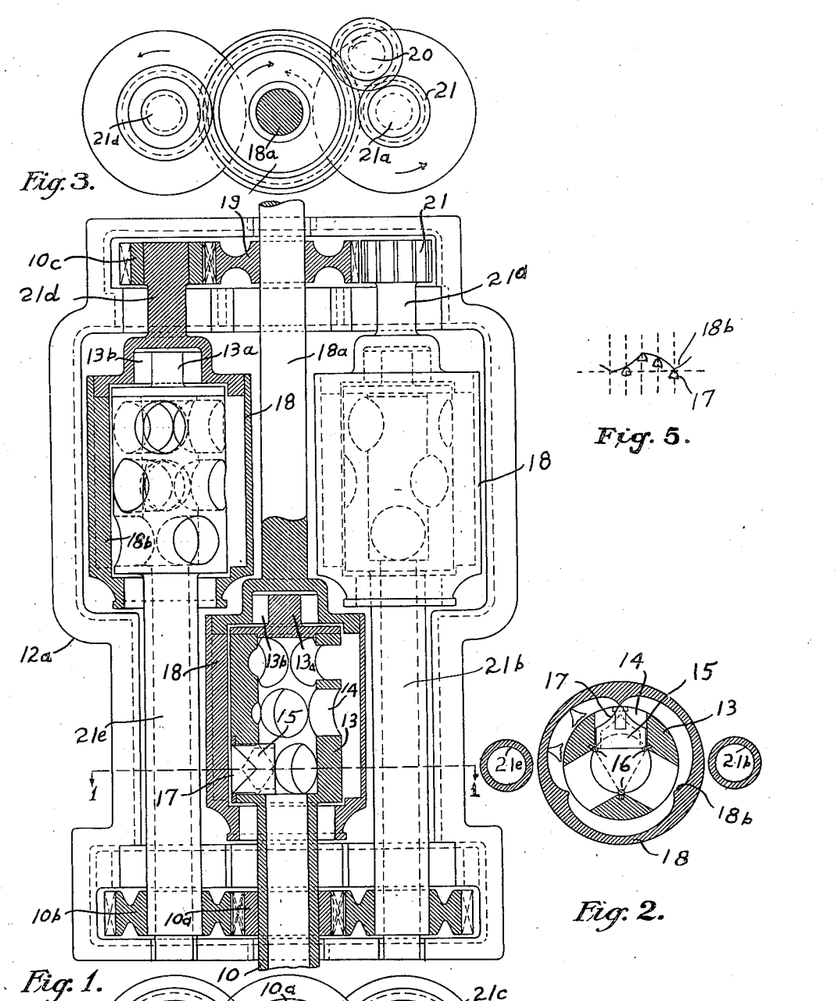
Fig. 1 is a central, longitudinal, sectional view of a portion of my invention substantially on lines X—X of Fig. 10.
Fig. 2 is a vertical, sectional view on line 1—1 of Fig. 1 with the exception of the outer casing.
Fig. 3 is an elevation view of the revoluble parts illustrated in Fig. 1 as viewed from the upper end of Fig. 1, but omitting the casing.
Fig. 5 is a diagrammatic view of the type of automatic clutch illustrated in Figs. 1 and 2.
Figure 4:
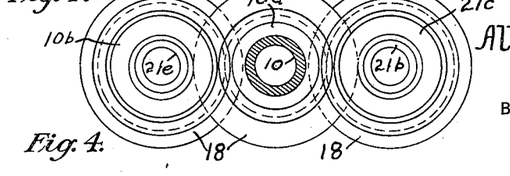
Fig. 4 is a view similar to Fig. 3, but illustrating said parts as viewed from the lower end of Fig. 1.

The pump 53, Fig. 10, is preferably connected to pipe 56 through a fitting 56a provided with a typical reducing valve adapted to permit some of the pumped oil to flow at reduced pressure from fitting 56a through pipe 56b leading such reduced oil pressure into and filling the cavity within casing portions 12a and 12b to surround the change gear mechanism enclosed therein shown either in Figures 1 or 6, which reduced oil pressure is also adapted to be conveyed to other portions of the mechanism where forced feed lubrication may be desired. The pressure of the oil within said casing portions 12a and 12b and surrounding either of said forms of change speed mechanism is normally substantially less than is adapted to flow through the pipes 56 as aforesaid. Respecting the form of change speed mechanism illustrated in Figures 1 to 4 inclusive said reduced oil pressure, in addition to lubricating the parts, also functions to maintain against their stops 16 each of the pistons 15 which is not subjected to the oil pressure from either pipe 56 tending to hold such subjected pistons in their outward positions. Respecting the structure of Fig. 6 said reduced oil pressure surrounds each of the tubes 18' and is adapted to flow through a plurality of openings 70 extending through the wall of each tube 18', through which openings 70 and otherwise said reduced pressure oil is in contact with each of the external surfaces of each pair of telescoped pistons 26 and 27, as well as between each of the cam surfaces 30 and 31 and within each bearing 13b. When the higher pressured oil coming from either tubular shaft 10', 21b', or 21e' through ports 25 into the cavity between each pair of telescoped pistons 26 and 27 for engaging their respective cam surfaces 30 and 31 in driving relationship, the substantially lesser pressure of the oil upon the outer surfaces of each pair of said pistons 26 and 27 is insufficient to impair the driving engagement of the cam surfaces 30 and 31; but upon the release of the greater oil pressure within any of the sets of telescoped pistons 26 and 27, the lesser pressure of the oil upon the external surfaces of such sets of pistons will quickly disengage their respective cooperable cam surfaces 30 and 31.

The lubricating oil pressure, for instance between the bore of tube 18 and the periphery of head 13 of Fig. 2 or between the cam surfaces 30 and 31, Figs. 6 and 6A not only affords substantial lubrication of these parts, but also acts as a cushion to relieve the suddenness of such contacts and the noise otherwise incident thereto.

In Fig. 10 the pedal 80 is adapted to release the friction clutch through which the motor drives the mechanism, when such clutch is employed; and when a brake is desired for the driven mechanism its operating pedal may be similar to and back to pedal 80 as is typical in automotive and similar practice.

Figure 11:
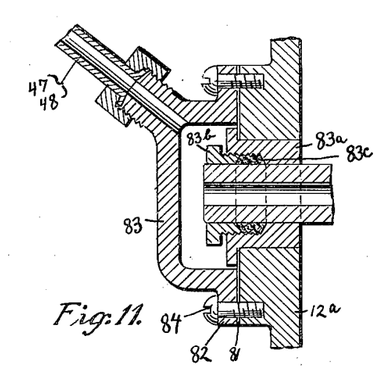
Figs. 11 and 12 are enlarged central vertical sectional views of the means for supplying the pressure oil to the respective transmission shafts.

Thus far in the description of my invention it has been contemplated that any convenient means may be provided for leading the fluid or oil pressure to each or either of the hollow shafts 10, 21b, 21e or 10', 21b', 21e'; I have provided means therefor which will now be described. The means therefor with respect to shafts 21b, 21e or 21b', and 21e' is indicated in Fig. 11 wherein the casing portions 12a, 12b surrounding each of said shafts is provided upon its outer surface with a substantially circular gasket 81 interposed between said casing portions and the flange 82 of a substantially circular housing 83 with which the fluid pressure oil pipe 47 or 48 is connected. The flange 82 is provided with bolts or screws 84 for clamping the same to the casing portions 12a, 12b with said gasket 81 between the clamp surfaces. Shafts 10, 21b and 21e may each be furthermore provided when desired, with a bushing 83a secured preferably in the casing portion 12a and surrounding each of said respective shafts. In the outer end of bushing 83a is preferably threaded in a recess thereof the packing member 83b adapted to compress packing gland 83c about each of the respective shafts 21b and 21e at 21b and 21e, to further prevent the escape of oil from around said shafts.

Figure 12:
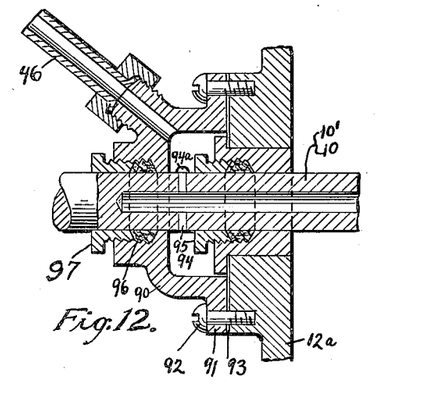
Figure 13:
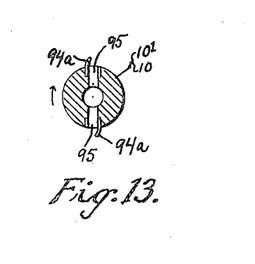
Fig. 13 is an enlarged central vertical sectional view taken on a plane passing through the opening 95 of Fig. 12.

The fluid pressure oil is preferably supplied to tubular shaft 10 or 10' by pipe 46 secured to a substantially circular casing 90, Fig. 12, surrounding said shaft and having flange 91 clamped by screws or bolts 92 to the outer surface preferably of casing member 12a with a gasket 93 clamped therebetween. Said oil pressure comes from said pipe 46 into a cavity 94 surrounding said shaft 10 or 10', and thence through a plurality of openings 95 through the wall of said tubular shaft 10 or 10'. The outer end of said casing 90, surrounding shaft 10 or 10' is provided with a packing gland 96 adapted to be clamped by member 97 in the usual or any other desired manner. To overcome the effect of centrifugal force of the rotating shaft 10 or 10' upon the oil within the radial openings 95 therethrough I provide an impeller blade 94a projecting from said shaft and inclined over each opening 95 in the direction of rotation of said shaft, Fig. 13, to induct oil into said openings 95.

Figures 6D, 14:
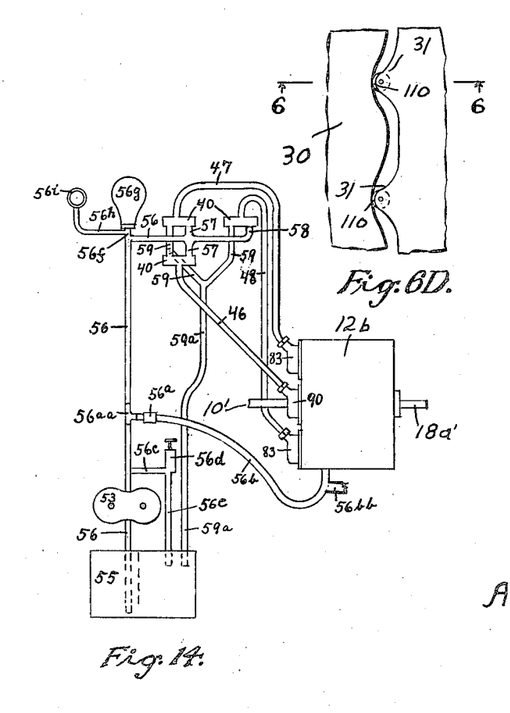
Fig. 6D is a view similar to Fig. 6B showing rollers on the tips of the cam projections to afford less wear.
Fig. 14 is a diagrammatical view of the piping to and from the oil supply and mechanism.

The drain pipes 59, Fig. 14, are connected by pipe 59a which returns the drain oil to the oil supply area 55 of Fig. 10, pipe 59a extending downwardly preferably upon the offside of Fig. 10 for said purpose.

From the casing of check valve 56a, in the instance shown in Fig. 10, extends a pipe 56c to a relief valve 56d communicating with pipe 56e which empties into the oil supply area 55. This enables the fluid pressure surplus to be returned to the oil supply area, the pressure at which valve 56d is set to open being that of the maximum oil pressure adapted to be supplied to shafts

10, 21b and 21c, and which controls the driving torque and hence the driving speed.

Preferably from a point conveniently in the piping 56 extends a pipe 56f leading to an airdome 56g. From pipe 56f extends a branch pipe 56h to pressure gauge 56i adapted to disclose its face through an opening in instrument panel 56j shown in dotted lines in Fig. 10, or to any other desirable place, for disclosing the working pressure of the oil substantially between 17 and 18b of Fig. 2 or between 30, 31 of Figs. 6, 6A. To accomplish a change of gear, by a different setting of the lever 30, as well as brake the car by the motor by leaving it in gear, when the motor is not running, the pressure in airdome 56g affords sufficient oil pressure for said purpose. For the purpose of preventing the oil pressure from escaping through pump 53 back into the oil supply area 55 a typical check valve 56aa is designed to be provided preferably within the casing of said valve 56a, Fig. 10, between the aligned pipe portions 56 leading thereto and therefrom, which check valve performs its usual function of permitting the flow of oil upward therethrough by closing and preventing any opposite flow of the oil.

The pump 53 may be a rotary or gear pump, either of which supplies a constant fluid pressure independent of the speed at which it is driven, said speed merely influencing the volume supplied by the pump. However, such pump may be of the centrifugal type wherein the pressure of the oil supplied by it is proportionate to the speed at which it is driven.

In one type of my invention I prefer to employ the rotary or gear pump and the airdome 56g which, while the motor is running, will cause pistons 15 and their cooperating cam portions 18b of Fig. 2, or the cam surfaces 30 and 31 of Figs. 6, 6A and 6B, which forms drive or power transmission, to be in engagement at a constant pressure which is designed to be such as will permit the slippage of said cam surfaces 30 and 31 to prevent the stalling of the motor when it is running at a substantial definite speed.

In the other type of my invention I prefer to employ the centrifugal pump 53. When the motor is running, the oil pressure supplied to pistons 15 or 26 and 27 is proportionate to the speed of the motor, and when lever 30A is not in neutral position, the engagement of pistons 15 with cam surfaces 18b, or of cam surfaces 30 and 31 of Figs. 6 and 6A, of the selected transmission, are at all times in driving engagement which will yield or slip to prevent the stalling of the motor at practically any of its many different operative speeds. In each of these forms, before stopping the motor it is preferable that it be briefly operated at high speed in order to build up a substantial pressure within airdome 56 and its associated pipes above the check valve, which check valve is adapted to retain such pressure for use, until the motor is again operated.

Fig. 14 illustrates a diagrammatic view of the pressure oil supply and drainage piping circuits, wherein the same reference characters designates the heretofore described parts in their modified arrangement required for clarification in this view.

Figure 6E:
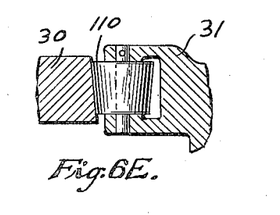
Fig. 6E is an enlarged sectional view on line 6—6 of Fig. 6D.

In Figs. 6D and 6E, I have shown the preferred construction of the cam projection 31 as being formed of a roller 110, rotatably mounted on each of said projections 31 and between bifurcated portions of said projection. The surface of each roller 110 and thin coacting cam surface 30 are conical, as shown in Fig. 6E in order to provide the most efficient frictionless and long wearing engagement.

The invention herein described may be manufactured and used by or for the Government of the United States for governmental purposes without the payment to me of any royalties thereon or therefor.

Having now described my invention so fully that others skilled in the art may therefore make and use the same, what I claim and desire to secure by Letters Patent is:

1. In a transmission means the combination of two members adapted to transmit driving torque, one of said members being provided with a piston mounted to move therewith as well as at an angle to the members, the other of said members being provided with a surface adapted to be engaged in driving engagement by said piston, means for applying a fluid under pressure to and removing the pressure from said piston to attain said driving engagement, and means for applying a fluid under pressure to the engageable surfaces of the piston and the other member to disengage said surfaces when the first stated pressure is removed.

2. In a transmission means the combination of two members adapted to transmit driving torque, one of said members being provided with a plurality of pistons each having a driving surface at one end, each piston being mounted to move therewith as well as at an angle to the members, the other of said members being provided with a driving surface adapted to be engaged in driving engagement by the driving surfaces of said pistons, means for applying a fluid under pressure to and removing the pressure from said pistons simultaneously to maintain said driving engagement during the pressure application, and means for applying a fluid under pressure simultaneously between the engageable surfaces of said pistons and other member to disengage said surfaces when the first stated pressure is removed.

3. In a transmission means the combination of two members adapted to transmit driving torque, one of said members having a plurality of pistons slidably mounted thereon substantially parallel to the longitudinal axis of the member, each of said pistons being provided with a driving surface, the other of said members being provided with driving surfaces adapted to be engaged in driving engagement by the driving surfaces of said pistons, means for applying fluid pressure to said pistons to attain said driving engagement and means for applying fluid under pressure to the driving surfaces to lubricate and disengage the same.

4. In a selective variable transmission, the combination of a driving and a driven means; a plurality of pairs of members having one of each pair intermediate, and drivingly connected respectively to, the driving and driven means; means whereby each of said pairs of members may be differently driven, a piston having a driving surface at one end and carried by one member of each of said pairs of members and movable relatively thereto at an angle to the direction of the driving movement of said member, the other member of each of said pairs of members being provided with a driving surface juxtaposed to said driving surface of the piston for driving the same by said piston carrying member, a separate fluid inlet for leading fluid to each piston, fluid pressure means for selectively applying fluid under pressure to the inlet of and holding the piston of any one pair of members in said driving engagement at a time, and means for applying fluid under pressure to and between the driving surfaces not desired to be in driving engagement for lubricating and disengaging said surfaces.

5. In a selective variable transmission, the combination of a driving and a driven means; a plurality of pairs of members having one of each pair intermediate, and drivingly connected respectively to, the driving and the driven means; means whereby each of said pairs of members may be differently driven, a piston carried by one member of each of said pairs of members and movable radially thereto and provided with a driving surface on its outer end, the other member of each of said pairs of members being provided with a driving surface juxtaposed to and extending throughout the path of the driven movement of its piston, separate fluid inlets for leading fluid to each piston, means including valve means for said inlets for applying fluid pressure to the inlet of and holding the driving surfaces of any one pair of members in driving engagement, and means for maintaining between all said driving surfaces a lubricant under lesser pressure than said fluid pressure whereby said pressure lubricant disengages and maintains the disengagement of the driving surfaces not maintained in driving engagement by the fluid pressure.

6. In a selective variable transmission, the combination of a driving and driven means; a plurality of pairs of members having one of each pair intermediate, and drivingly connected respectively to, the driving and the driven means; means whereby each of said pairs of members may be differently driven, a piston having a driving face and driven by one member of each of said pairs of members and movable longitudinally thereto, the other member of each of said pairs of members being provided with a driving surface juxtaposed to and adapted to be engaged at any time by the driving face of said piston for driving the same by said piston driving member, selective means having at least one element common to each pair of members for holding only the driving face of the piston of any one pair of members in said driving engagement at a time, and means for applying a force to and between said driving faces not desired to be in driving engagement to disengage the same.

7. In a transmission means the combination of two members, one of said members being provided with a piston having a driving face and mounted to move therewith as well as relatively at an angle to its direction of movement, the other of said members being provided with a driving face adapted to be engaged in driving engagement by said surface of the piston, means for applying fluid pressure to a different face of said piston for moving said piston into and maintaining its driving engagement, said coacting driving faces having complementary portions of different heights for moving the piston and displacing some of said fluid when said faces slip to avoid stalling the driving power, and means for applying fluid pressure between said driving faces for lubricating and disengaging said faces.

8. In a transmission means the combination of two members adapted to transmit driving torque, one of said members being provided with a piston having a driving face and mounted to move therewith as well as relatively at an angle to its direction of movement, the other of said members being provided with a driving face adapted to be engaged in driving engagement by said piston, means for applying a substantially constant fluid pressure to and between said driving faces for lubricating said faces and moving said piston out of said driving engagement, and means for applying a greater fluid pressure to a different face of said piston for moving the piston into and maintaining its driving engagement.

9. In a transmission means the combination of two members adapted to revolubly transmit driving torque, one of said members being provided with a piston having a driving surface and mounted to move radially therewith as well as relative to its rotation, the other of said members being provided with a driving surface surrounding and adapted to be engaged in driving engagement by, said surface of the piston, means for applying a substantially constant fluid pressure to and between said driving engageable surfaces for moving said piston out of said driving engagement, and means for applying a greater fluid pressure to a different face of said piston for moving the piston into and maintaining its driving engagement.

10. In a transmission means the combination of two rotatable members, one of said members being provided with a piston having a cam surface and mounted to move therewith as well as relatively longitudinally to its direction of movement, the other of said members being provided with a cam surface having a plurality of cam projections disposed in a circular path and adapted to be engaged in driving engagement by the cam surface of said piston, means for applying a substantially constant fluid pressure to a face of said piston adapted to move said piston out of said driving engagement, and means for applying a greater fluid pressure to a different face of said piston for moving the piston into and maintaining its driving engagement.

11. In a selective variable transmission, the combination of a driving and a driven means; a plurality of pairs of members having one of each pair intermediate, and drivingly connected respectively to, the driving and the driven means; means whereby each of said pairs of members may be differently driven, a piston having a cam surface and carried by one member of each of said pairs of members and movable relatively thereto at an angle to the direction of the driving movement of said member, the other member of each of said pairs of members being provided with a cam surface having a plurality of cam projections disposed in a circular path and adapted to be engaged by said piston for driving the same by said piston carrying member, means for applying a substantially constant fluid pressure between each of said cam surfaces for normally holding them out of their said driving engagement, and means having at least one element thereof common to each pair of members for, at will, applying a greater yieldable fluid pressure selectively to only one of said inlets at a time which communicates with a different surface of the pistons of either pair of said members for maintaining their driving engagement whereby the slippage of the cam surfaces permitted by the yielding of the fluid pressure prevents stalling.

12. In a selective variable transmission, the combination of a driving and a driven means; a plurality of pairs of rotatable members having one of each pair intermediate, and drivingly connected respectively to, the driving and the driven means; means whereby each of said pairs of members may be differently driven, a piston having a driving surface at its outer end and radially carried by one member of each of said pairs of members and movable radially thereto, the other member of each of said pairs of members being provided with an internal surface extending over and adapted to be engaged by said driving surface of the piston for driving the other member by said piston carrying member, means for applying a substantially constant fluid pressure to and between said surfaces for normally holding said pistons out of their said driving engagement, and means for, at will, applying a greater yieldable fluid pressure to a different surface of the piston of only one selected pair of said members at a time for moving said piston into and maintaining their driving engagement.

13. In a selective variable transmission, the combination of a driving and a driven means; a plurality of pairs of members having one of each pair intermediate, and drivingly connected respectively to, the driving and the driven means; means whereby each of said pairs of members may be differently driven, a piston having a cam surface at one end and drivingly carried by one member of each of said pairs of members and movable longitudinally thereto, the other member of each of said pairs of members being provided with a cam surface having a plurality of cam projections disposed in a circular path adapted to be engaged by the cam surface of said piston for driving the same by said piston carrying member, means for applying a substantially constant fluid pressure between the juxtaposed cam surfaces for lubricating and normally holding said cam surfaces out of their said driving engagement, a separate fluid inlet for each pair of members and communicating with the surface of said piston other than its cam surface, selective means for, at will, applying a greater yieldable fluid pressure at a time to only the inlet of one pair of said members for moving said pistons into and maintaining their driving engagement, and means for draining residue of the greater pressure fluid from each piston not in driving engagement.

14. In a transmission means the combination of a shaft adapted to be revolved and having a longitudinal cavity therein, at least one opening extending radially from said cavity through the wall of said shaft, at least one piston slidably mounted in and closing said opening, a second shaft adapted to be mounted coaxially with said first named shaft and having a flange rigidly secured thereto extending over the portion of said first named shaft provided with said at least one piston, said flange being provided with an internal cam surface adapted to be engaged by said at least one piston, means whereby a fluid pressure may be applied in the cavity of said first named shaft and to the inner face or faces of said piston or pistons, and means for applying a fluid pressure between the juxtaposed portions of said cam surface and piston for moving the same out of engagement when the first stated fluid pressure does not maintain said engagement.

15. In a transmission means the combination of two shafts coaxially mounted and adapted to be rotated, one of said shafts being provided with a longitudinal opening therein having an outlet through the wall of said shaft, the other of said shafts being provided with a flange fixed thereto and extending over a portion of said other shaft, a piston mounted upon and slidably keyed to the shaft provided with said opening and adjacent said outlet, cooperable driving cam surfaces carried by said piston and said flange, means for applying fluid pressure to said longitudinal opening for moving said piston upon its shaft for moving said cam surfaces into driving engagement, and means for applying a lesser pressure fluid between said cam surfaces for lubricating and normally holding the same out of driving engagement.

16. In a transmission the combination of two shafts coaxially mounted and adapted to be rotated, one of said shafts being tubular and the other provided on its adjacent end with a tubular portion extending over a portion of the other shaft, a pair of hollow pistons having their skirts telescoped and oil sealed over each other and each keyed at its longitudinal center to surround and move longitudinally on the tubular shaft within said tubular portion, a fluid port extending through the wall of said tubular shaft between the heads of said pistons, means for at will applying a yieldable fluid pressure within the bore of said tubular shaft, bearing portions fixed on said tubular portion with said telescoped pistons between said bearing portions, and cooperable cam means on the juxtaposed surfaces of each of said pistons and bearing portions for moving the pair of pistons toward each other and displacing some of the yieldable fluid pressure when the driving torque transmitted by the cam means would tend to stall or stop the rotation of the tubular shaft.

17. The apparatus and combination of claim 16 characterized by means for applying a pressure medium between said cam means for moving said pistons and freeing the engagement of said cam means when said yieldable fluid pressure ceases to be applied between said pistons.

18. The apparatus and combination of claim 16 comprising a selectively variable transmission characterized by the elements of said claim being provided in a plurality of duplicate sets each set being adapted to be differently driven, a driving and a driven means, means for operatively connecting one shaft of each set respectively to the driving and the driven means, the means for applying a fluid pressure being further characterized as including a separate control means for each set and being operated by a selective means for arbitrarily admitting a fluid pressure within the bore of only one of the tubular shafts at any time, said selective means including a fulcrumed gear shift lever having a different path of travel for controlling the admission of the pressure fluid to each set selectively, and said lever having a portion selectively engaging with and operating each of said separate control means at different desired times.

19. In a power transmission the combination of a driving and a driven means having driving engageable elements intermediate them, an oil pump adapted to be driven by the driving means, a reservoir adapted to contain an oil supply, oil pressure means adapted to hold elements of said driving and driven means in driving engagement, feed pipes leading from said reservoir to said pump and from said pump and reservoir to said pressure means and a source of oil supply, a pipe leading from the oil supply to the pump, a pipe leading from the delivery side of the pump to the oil supply, and a relief valve in said last named pipe for automatically controlling the pressure in the reservoir.

20. The apparatus and combination of claim 19 further characterized by means for receiving an oil pressure adapted to release said pressure means, and a second pipe provided with a relief valve leading to said pressure receiving means from said pipe leading from said pump to said pressure means.

21. In a power transmission the combination of a driving and a driven means, a plurality of means intermediate the driving and driven means, said plurality of means each having a pair of elements, means for differently driving one element of each pair, means for differently drivingly connecting the other element of each pair to the driven means, a separate oil pressure means for holding the elements of any pair in driving engagement and each having an operative element in different planes, and a universally pivoted change gear lever having a portion adapted to move through different planes for operatively engaging said element of either of said pressure means for selectively applying oil pressure to only one of said pressure means at a time.

22. The apparatus and combination of claim 21 further characterized by an oil reservoir, an air dome therefor, an oil pump connected to the reservoir and adapted to be driven by the driving means and to supply oil pressure from said reservoir to each of said pressure means through said selective means, and a check valve between said pump and pressure means for automatically turning the oil flow to its source for controlling the pressure to which the pressure means and reservoir may be subjected.

23. The apparatus and combination of claim 21 further characterized by the element of each pressure means consisting of a valve means for controlling the oil flow to and from each of said pressure means, a stem for each valve means, a slot in each stem normally adapted to be engaged by the portion of the lever, and means having slots therein registering with the respective stem slots when in normal position for permitting the entrance and exit of the lever portion to and from the stem slots only in their normal positions.

24. The apparatus and combination of claim 21 further characterized by a separate valve for each of said pressure means, a separate slidable stem for each of said valves, a slot in each of said stems adapted to receive said portion of the change gear lever, and means for preventing the removal of said portion of the change gear lever from either of said slots after its stem has been moved from its normal closed position until said stem has been returned to its normal position.

25. In a transmission, the combination of a pair of rotary elements having relative longitudinal movement and juxtaposed respective driving and driven surfaces of longitudinally varying projection, only a portion of which surfaces being adapted to be frictionally engaged for transmitting rotary motion, there being a space between the engaged portions of said surfaces, means for applying a fluid under pressure into said space for relatively longitudinally moving said elements and maintaining the engageable portions thereof out of frictional contact when said surfaces are not in transmission engagement, said rotary elements being pistons having said surfaces occupying only a portion of their areas, and means for applying to at least one of the pistons a fluid under pressure greater than that of the fluid in the space between said surfaces for displacing some of the last stated fluid and maintaining portions of said surfaces in contact while engaged in power transmission.

ALLAN J. CHANTRY.